(12) United States Patent
James et al.

(10) Patent No.: US 10,848,473 B1
(45) Date of Patent: Nov. 24, 2020

(54) SECURE MANAGEMENT OF SECURITY KEYS TO CONTROL ACCESS TO A PROTECTED COMMUNICATION NETWORK

(71) Applicant: Cox Communications, Inc., Atlanta, GA (US)

(72) Inventors: Steven Blake James, Norcross, GA (US); Anthony Paul Davis, Alpharetta, GA (US); Jose Ignacio Gonzalez, Cumming, GA (US); Nick Anthony Sargent, Woodstock, GA (US); Jeffrey Alan Bergstedt, Chesapeake, VA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 319 days.

(21) Appl. No.: 15/887,598

(22) Filed: Feb. 2, 2018

(51) Int. Cl.
| *H04L 29/06* | (2006.01) |
| *H04L 9/08* | (2006.01) |
| *H04L 29/08* | (2006.01) |
| *H04L 9/32* | (2006.01) |
| *H04N 21/2347* | (2011.01) |

(52) U.S. Cl.
CPC ............ *H04L 63/08* (2013.01); *H04L 9/0816* (2013.01); *H04L 9/321* (2013.01); *H04L 63/10* (2013.01); *H04L 67/06* (2013.01); *H04N 21/2347* (2013.01)

(58) Field of Classification Search
CPC ....... H04L 63/08; H04L 9/321; H04L 9/0816; H04L 63/10; H04L 67/06; H04N 21/2347
See application file for complete search history.

(56) References Cited

U.S. PATENT DOCUMENTS

| 6,983,371 | B1 * | 1/2006 | Hurtado | .................. G06F 21/10 |
| | | | | 380/255 |
| 2014/0075582 | A1 * | 3/2014 | Hierro | ................... H04L 63/123 |
| | | | | 726/30 |
| 2015/0081565 | A1 * | 3/2015 | Roullier | ................ H04L 9/0816 |
| | | | | 705/64 |
| 2017/0075627 | A1 * | 3/2017 | Pradeep | ................ G06F 16/955 |

* cited by examiner

*Primary Examiner* — Mohammed Waliullah
(74) *Attorney, Agent, or Firm* — Merchant & Gould

(57) ABSTRACT

Aspects of the present disclosure provide for systems and methods to automatically load security access files and/or keys on a local digital controller serving subscriber communication equipment, but are not so limited. A disclosed system operates to use a deployment manager as part of auto-loading security access files and/or keys on a local digital controller serving subscriber communication equipment. A disclosed method operates in part to auto-load security access files and/or keys on a local digital controller serving subscriber communication equipment.

20 Claims, 7 Drawing Sheets

SECURE MANAGEMENT OF SECURITY KEYS TO CONTROL ACCESS TO A PROTECTED COMMUNICATION NETWORK

BACKGROUND

A technical problem associated with preventing unauthorized and/or fraudulent access to service provider networks and/or equipment occurs when attempting to deploy new digital hardware, such as a digital set-top box or other digital service terminal, into a complex communication architecture that may include secure and unsecure network channels. For example, a digital television service provider may deploy an optical distribution network that includes secure gateways that allow backend equipment to securely interface with headend equipment and provide digital content such as television programming, video on demand, pay-per-view content, music, interactive content, games, educational content, remote monitoring services, etc. In some implementations, a service provider relies on one or more third parties to supply consumer premise equipment (CPE) and/or maintain security keys and/or decryption hardware/software that enable the CPE to securely access the service provider network. With the continually emerging threat of unauthorized access, hacking, and/or other fraudulent use or access of service provider services, a technical solution is needed to reduce or eliminate intrusions of the service provider network.

A service provider typically provides CPE, such as a set-top box (STB), to the subscriber for placement in a home, business, or other location. Many different types of CPEs are available in the marketplace and each CPE have a distinct key encryption and decryption technique to ensure proper access to service provider services. Each CPE can be implemented as a controlled network device under the control of the service provider via headend equipment of the distribution network. The CPE includes the functionality to receive content transmitted from the headend equipment, and to descramble and/or decrypt the transmitted content. A service provider may implement various security protocols in efforts to reduce or eliminate likelihood of pirating of programming content and/or unauthorized access of content to others that are not authorized users. For example, a conditional access framework can be used in an effort to minimize pirating and/or unauthorized use of content offered by the service provider. A service provider may utilize a conditional access provider to scramble and/or encrypt content before transmission over the media distribution network, and to descramble and/or decrypt that content at an STB of an authorized subscriber. A condition access service may generate and/or verify security keys and/or algorithms (e.g., cryptographic keys, decryption algorithms, etc.) used for scrambling/descrambling and/or encryption/decryption. However, a service provider would prefer to control such protective operations as well as whether a third party network or system is allowed to be used or accessed.

SUMMARY

Aspects of the present disclosure provide for systems and methods to automatically load security access files and/or keys on a local digital controller serving subscriber communication equipment, but are not so limited. A system of an embodiment operates to use a deployment manager as part of auto-loading security access files and/or keys on a local digital controller serving subscriber communication equipment. A method of an embodiment operates in part to auto-load security access files and/or keys on a local digital controller serving subscriber communication equipment.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
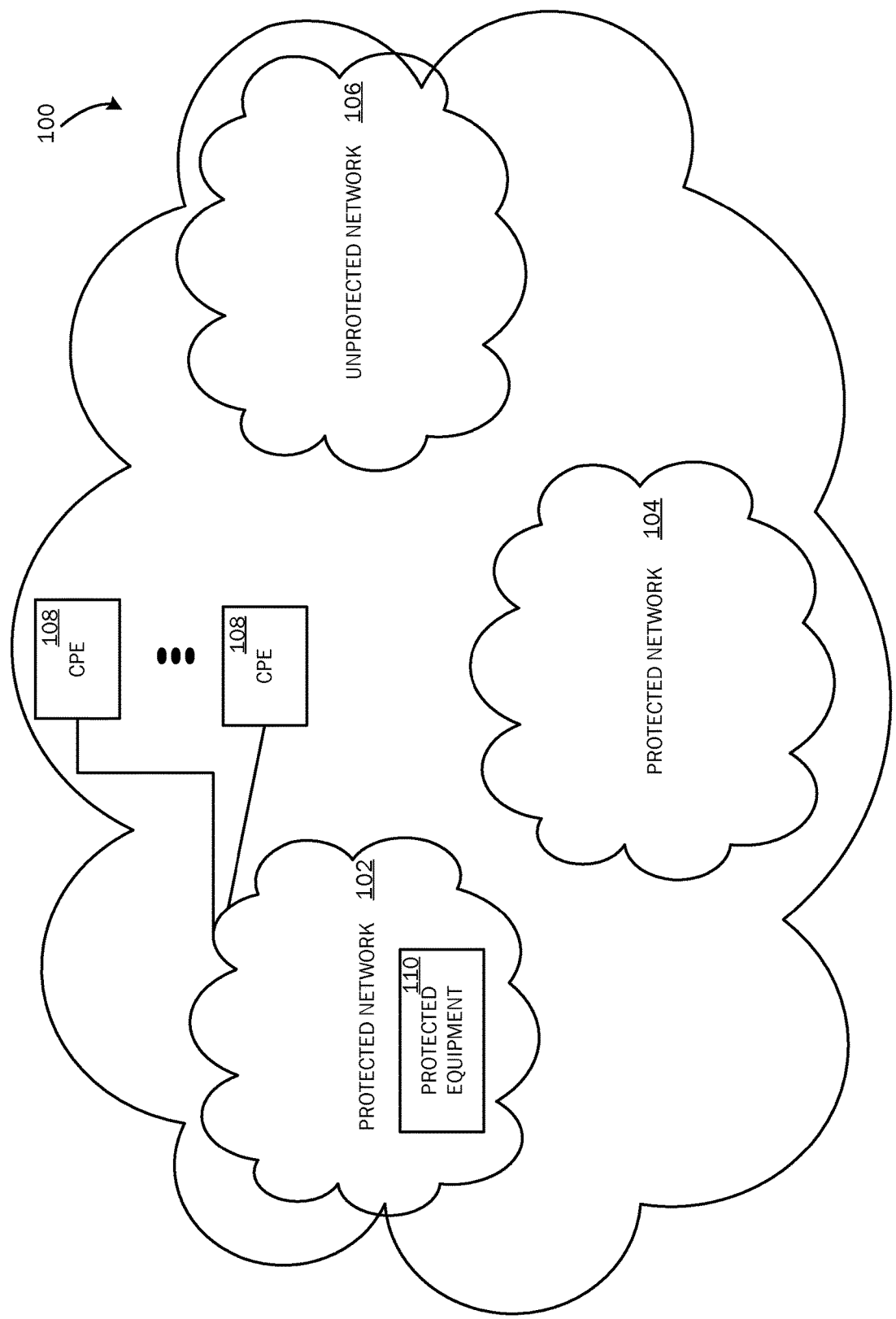
FIG. 1 is a block diagram of a communication architecture, according to an embodiment.

FIG. 1 is a block diagram of a communication architecture 100 that can be used as part of securely managing access to a protected service provider network or system, but is not so limited. As shown in FIG. 1, the architecture 100 of an embodiment includes a protected network 102, a protected network 104, and/or an unprotected network 106. For example, protected network 102 can correspond to a service provider distribution network that enables access to various services and/or products for subscribers via the protected network 102, protected network 104 may be associated with a third party computer system, and the Internet may comprise unprotected network 106 for example.

One implementation example deploys network distribution equipment that includes optical fiber, optical transmission equipment (e.g., laser modules, etc. and reception equipment (e.g., photodiodes, etc.), coaxial, radio frequency transmission and reception equipment, etc. to provide communication pathways for the architecture 100. The physical components associated with the network distribution equipment are deployed throughout the protected network 102 to provide services to subscriber communication equipment 108 (e.g., consumer premise equipment (CPE)) located according to subscriber preferences. Communication architecture 100 may encompass a variety of network types including, but not limited to, fiber-coax networks, the Internet, public switched telephone networks, global telephone networks, intranet, extranet, local-area networks, wide-area networks, wired and/or wireless networks, etc. and combinations thereof.

As described below, unauthorized access to the protected network 102, protected communication equipment 110, and/ or any associated services can be reduced and/or eliminated in part by auto-loading security access files and/or keys on a local digital controller serving subscriber communication equipment 108. According to an embodiment, unauthorized or fraudulent access can be reduced and/or eliminated by an automated regeneration of security access files and/or keys for subscriber communication equipment, auto-loading of security access keys on a local digital controller serving the subscriber communication equipment, and/or auto-posting equipment into billing/provisioning systems of the service provider.

As described further below, the protected equipment 110 utilizes a protection mechanism that operates with backend communication equipment and/or headend communication equipment to ensure that access to key access files that define security keys are controlled by the service provider. According to one embodiment, the protection mechanism manages access to the protected network 102 by retrieving one or more batch files associated with the subscriber communication equipment 108, retrieving one or more key access files associated with the subscriber communication equipment 108, validating that the one or more key access files correspond to the one or more batch files, auto-posting one or more validated key access files, monitoring an output of a headend component for auto-processing results of the one or more validated key access files by the headend component, using the headend component to auto-process the one or more validated key access files to output successful auto-processing results or unsuccessful auto-processing results and/or storing the output in memory storage for consumption by the protection mechanism.

Figure 2:
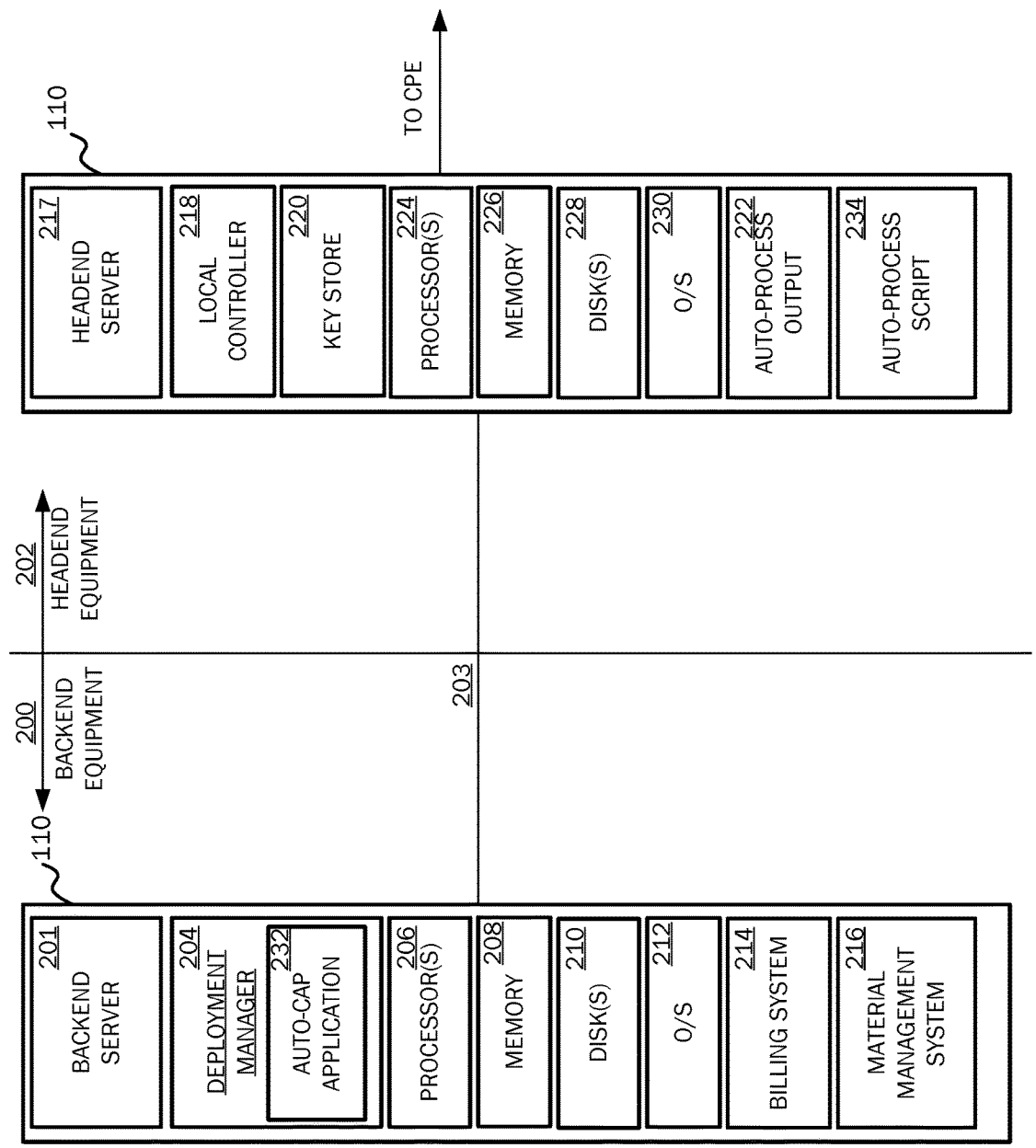
FIG. 2 is a block diagram of components included with protected equipment of a protected network, according to an embodiment.

FIG. 2 is a block diagram of components included with the protected equipment 110 of the protected network 102, according to an embodiment. As shown in FIG. 2, the protected equipment 110 includes backend equipment 200 and headend equipment 202 coupled to one another via hardware coupling link 203, but is not so limited. The backend equipment 200 of an embodiment includes backend server machine(s) 201 that includes a deployment manager 204, at least one processor 206, memory 208, disk(s) 210, operating system (O/S) 212, a billing system 214, and/or a material management system 216. The headend equipment 202 of an embodiment includes headend server machine(s) 217 that includes a local controller 218, a key store, 220, an auto-process output store 222, at least one processor 224, memory 226, disk(s) 228, and/or operating system (O/S) 230.

With continuing reference to FIG. 2, the deployment manager 204 operates as a protection mechanism to ensure that access to the protected network 102 is limited to subscribers. The deployment manager 204 operates in part to reduce or eliminate pirating of programming content and/or unauthorized access of content or the network 102. The deployment manager 204 of one embodiment includes an auto-cap application 232 that comprises complex programming code that controls deployment and/or auto-loading of key access files and/or keys on the local controller 218 of the headend server machine 217 without requiring use of a web service call that operates outside of protected network 102.

The key access files define security keys that enable the subscriber communication equipment 108 to access services and/or products available from the service provider via the protected network 102. Unique keys can be provided for each CPE. A key database can be used to store a key access files and CPE pairings. Secure access keys can be written into the one time programmable (OTP) memory of each CPE. As an example, secure access keys can be written to a system-on-a-chip (SoC) that is part of the CPE. Secure keys can be written into CPE memory in a protected format to reduce unauthorized access, such that the keys are uncovered and/or unscrambled when the CPE attempts to access the protected network 102.

The auto-cap application 232 of an embodiment is used to control access to the protected network 102 by the subscriber communication equipment 108 in part by: retrieving one or more batch files that correspond to the subscriber communication equipment 108 from a trusted third party computer system, issuing a hold command on the processing of the one or more batch files before retrieving one or more key access files to control access by the subscriber communication equipment 108, validating that the one or more key access files correspond to the one or more batch files, auto-posting one or more validated key access files to the key store 220, and monitoring an auto-process output store 222 for output provided by the auto-process script 234 of the headend server machine 217 that includes successful auto-processing results or unsuccessful auto-processing results associated with application of the auto-process script 234 to the one or more validated key access files provided by the auto-cap application 232. Exemplary batch files may include, but is not limited to: a Header record: Site ID, total number of detail records, Delivery Id; Detail record: Original Pick date, SKU (for item), ICOMS Item number, Item Group, Pallet ID, Serial number, Alternate Serial number, MAC Address1, MAC Address2, MAC Address3, Alternate MAC Address, Item Group Over-Ride (for kitted CPE), and/or other data.

According to one implementation, the auto-cap application 232 uses an update process to monitor success and/or failure folders on the local controller 218 following the placement of EMM (Entitlement Management Message) files (e.g., tar files) on the local controller 218 by the auto-cap application 232. The local controller 218 auto-processes EMM files and generates either a success result file or a failure result file that is consumed by the auto-cap application 232. According to such an implementation, the auto-cap application 232 consumes and either auto-posts the equipment batch (e.g., AutoCap/ICOMS equipment batch) or assigns an error status to the equipment batch for subsequent analysis and resolution. While a variety of operational components are described with respect to the backend equipment 200 and headend equipment 202, it will be appreciated that additional or fewer components may be employed and/or components and associated functionalities can be distributed throughout the protected network 102.

Figure 3:
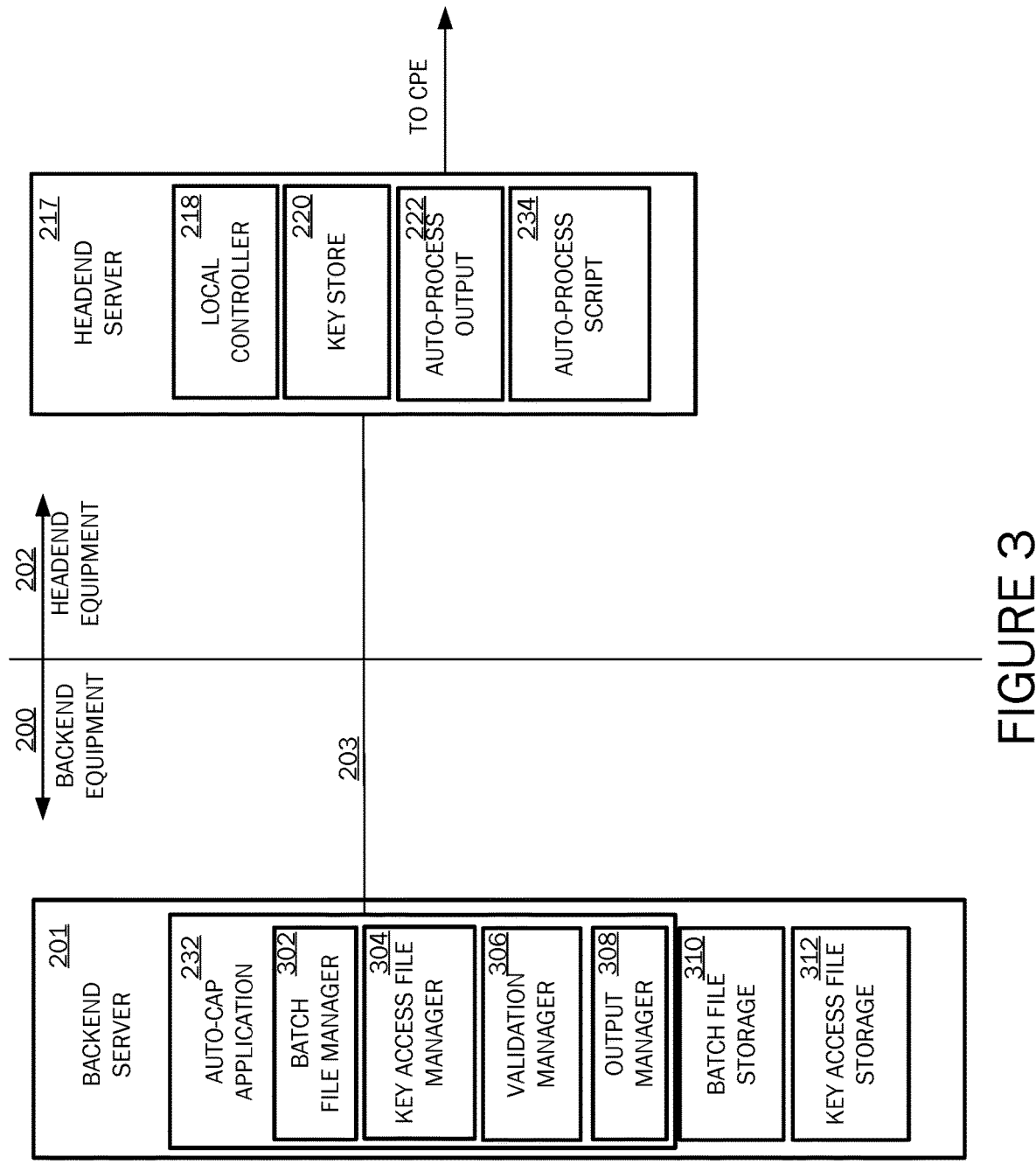
FIG. 3 is a block diagram of components included with an auto-cap application of a backend server, according to an embodiment.

FIG. 3 is a block diagram of components included with the auto-cap application 232 of the backend server(s) 201, according to an embodiment. As shown in FIG. 3, the auto-cap application 232 includes a batch file manager 302, a key access file manager 304, a validation manager 306, and an output manager 308. The batch file manager 302 of one embodiment uses the processor 206 to periodically check a trusted third party computer network or system for available batch files and then execute a file transfer protocol (FTP) command to retrieve available batch files from the trusted third party computer network or system, where the one or more batch files correspond to CPE to be deployed in the field.

After retrieving the one or more batch files, the batch file manager 302 stores the one or more batch files in batch file storage 310. The batch file manager 302 can automatically generate a message that is sent to the key access file manager 304 to inform of one or more available batch files. Alternatively, or in combination, the key access file manager 304 can periodically check the batch file storage 310 for batch files. The key access file manager 304 of one embodiment uses the processor 206 to execute an FTP command to retrieve one or more key access files that correspond to the CPE of the batch files from the same or a different trusted third party computer network or system. The key access files contain key data and/or decryption algorithms that enable the CPE to access the protected network 102 and/or services/products associated therewith. The key access files of one embodiment comprise EMM files that include EMM data for controlling access to the protected network 102 by subscriber CPE. The key access file manager 304 temporarily stores the key access files in the key access file storage 312.

The validation manager 306 is programmed to validate that the key access files correspond to the batch files. According to one embodiment, the validation manager 306 is programmed to validate that the key access files correspond to the batch files. For example, the validation manager 306 validates that a key access file (e.g., EMM file) created by a vendor matches, according to serial number, the batch to be loaded into the billing system. Once the validation manager 306 validates one or more key access files, the key access file manager 304 auto-posts the one or more validated key access files to the local controller 218 for processing by the auto-process script 234. The key access file manager 304 of one embodiment uses an FTP command to auto-post validated key access files to the key store 220 for processing by the auto-process script 234.

The auto-process script 234 of one embodiment periodically checks the key store 220 for auto-posted key access files that comprise validated EMM files and, if validated EMM files exist in the key store 220, processes the validated EMM files to output successful or unsuccessful processing results to the auto-process output store 222. For example, the auto-process script 234 can be programmed to process EMM files to generate secure access keys for the CPE; if the EMM files are corrupt or otherwise improper, the auto-process script 234 can generate a file or message that includes errors or issues associated with the unsuccessfully processed EMM file.

The output manager 308 can be programmed to periodically monitor or query the auto-process output store 222 for successful or unsuccessful processing results (e.g., files and/or messages) and take any necessary action including auto-posting batch files associated with successfully processed key access files to an internal billing and/or inventory tracking system. For example, upon retrieving an unsuccessful processing result from the auto-process output store 222, the auto-cap application 232 can generate a displayable or audible alert or communicate a message to inform a user of the problem. Key access files that are successfully processed by the auto-process script 234 can be stored in the key store 220 for subsequent deployment to CPE. Batch files and/or key access files may be deleted from the batch file storage 310 and the key access file storage 312 after successful key access file processing.

Figure 4:
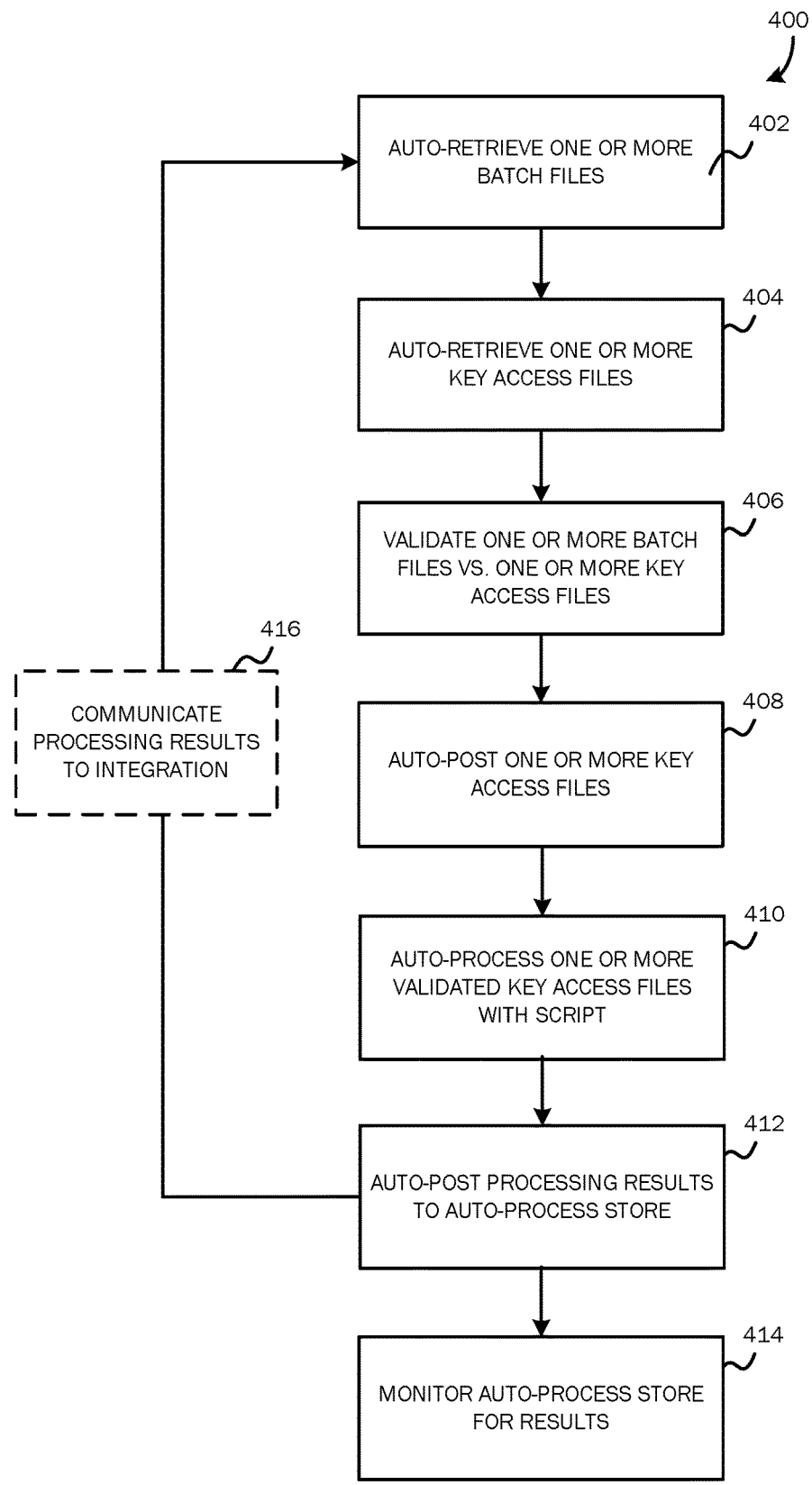
FIG. 4 is a flow diagram that depicts a process of auto-loading security access keys on a local digital controller serving consumer premise equipment (CPE), according to an embodiment.

FIG. 4 is a flow diagram that depicts a process 400 of auto-loading security access keys on a local digital controller 218 serving CPE, according to an embodiment. Local digital controller 218 may be physically located with head-end equipment 202 to receive downstream messages from backend equipment and upstream messages from the CPE once deployed. At 402, the process 400 begins by using batch file manager 302 to automatically retrieve one or more batch files associated with a future deployment of the CPE. At 404, the process 400 uses the key access file manager 304 to automatically retrieve one or more key access files associated with the one or more batch files. At 406, the process 400 uses the validation manager 306 to automatically validate that the one or more key access files correspond to the one or more batch files.

At 408, the process 400 uses the key access file manager 304 to auto-post one or more validated key access files to the key store 220. At 410, the process 400 uses the auto-process script 234 to process the validated key access files included in the key store 220 that correspond with the to be deployed CPE. At 412, the process 400 uses the auto-process script 234 to post successful and/or unsuccessful processing results associated with the processing of the validated key access files to the auto-process output store 222. At 414, the process 400 monitors the auto-process output store 222 with the auto-cap application 232 for processing results posted by the auto-process script 234. Optionally, at 416, the process 400 can automatically communicate the processing results to an Integration Specialist for additional analysis.

Figure 5:
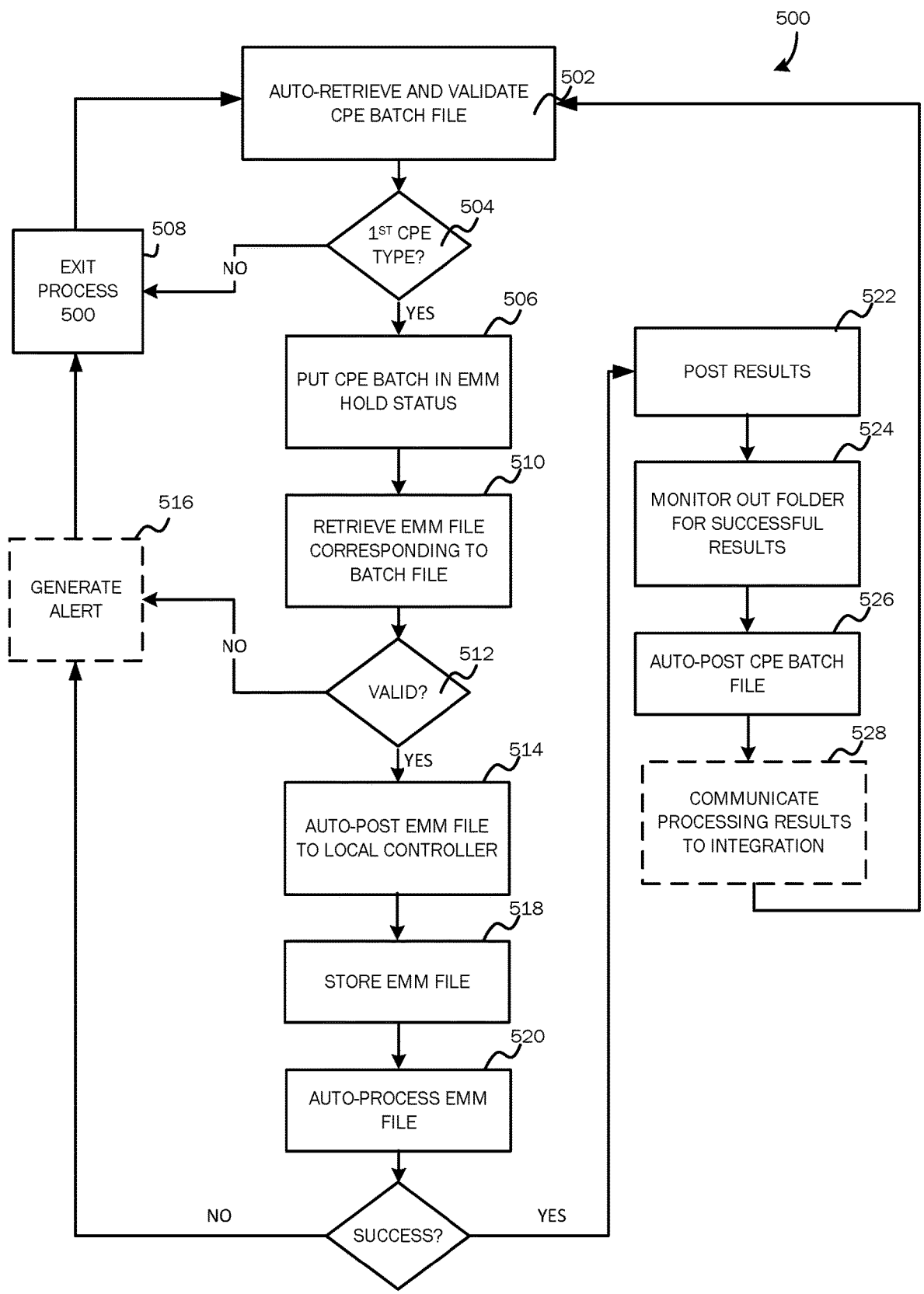
FIG. 5 is a flow diagram that depicts a process of securely provisioning CPE into a service provider network, according to an embodiment.

FIG. 5 is a flow diagram that depicts a process 500 of securely provisioning CPE into a service provider network, according to an embodiment. At 502, the process 500 begins by calling the batch file manager 302 to automatically retrieve and validate a CPE batch file (e.g., validate ADD batch) associated with to be deployed CPE. The process 500 of one embodiment uses the auto-cap application 232 to perform several preliminary validations of the batch including, but not limited to: 1) Number of records in the batch does not match header, maximum is 9,999; 2) Site ID must be valid and match current database; 3) Delivery ID must be unique; 4) Serial number does not exist with different Item number; 5) Item number must be a valid number in ICOMS; 6) Item Group ID must be a valid number in ICOMS or Drop Ship; 7) Restock date must be a valid date and not a future date; 8) Validate serial number minimum length; 9) Validate MAC Address maximum length; 10) Serial number masking validation; 11) MAC address number masking validation; 12) Required MAC address per number of components missing, and/or other operations.

According to one implementation, the auto-cap application 232 can be integrated with a material management application of the service provider and/or a third party online provisioning (OLP) application to send and/or receive electronic messages there between as part of auto-loading the EMM file into the protected network 102.

The auto-cap application 232 can be configured as a middleware layer to coexist with the material management application (e.g., inventory, provisioning, billing, etc.) and/or OLP application. The material management application can be used to order the CPE from a third party computer system, such as an equipment vendor computer system. According to one implementation, once the CPE order is entered via the material management application, the third party computer system auto-places the CPE batch file on an FTP server for retrieving by the batch file manager 302. If the CPE order is for CPE of a first type (e.g., Cisco STB), the third party computer system operates to auto-place an EMM file associated with the CPE batch file on the same or a different FTP server.

If the batch file manager 302 identifies that the CPE is of a first type (e.g., not manufactured by a first manufacturer) at 504, the process 500 proceeds to 506 and executes a command to place the CPE batch file in EMM HOLD status which delays further processing and/or posting of the CPE batch file. If the batch file manager 302 identifies that the CPE of the CPE batch file is not of a first type (e.g., not manufactured by a first manufacturer) at 504, the process 500 proceeds to 508 and exits process 500.

At 510, while in the EMM HOLD status to delay processing of the CPE batch file, the process 500 calls the key access file manager 304 to automatically retrieve an EMM file associated with the CPE batch file from the same or a different FTP server. At 512, the process 500 calls the validation manager 306 to automatically determine if EMM file validates with the CPE batch file. If the EMM file does not validate with the CPE batch file at 512, the process 500 can optionally proceed to 516 and generate an alert or other notification and/or exit the process 500 at 508.

If the EMM file does validate with the CPE batch file at 512, the process 500 at 514 calls the key access file manager 304 to auto-post the validated EMM file to the local controller 218 (e.g., place in IN folder for auto-consume). At 518, the process 500 uses the local controller 218 to store the validated EMM file in the key file store 220. At 520, the process 500 uses the auto-process script 234 to automatically process the validated EMM file for the to be deployed CPE. At 522, the process 500 uses the auto-process script 234 to post processing results to the auto-process output store 222 (e.g., place in OUT folder for auto-consume) associated with the auto-processing of the validated EMM file. Unsuccessful processing of the EMM file at 520 causes the process 500 to return to 516 and/or 508.

At 524, the process 500 calls the output manager 308 to monitor the auto-process output store 222 for successful and/or unsuccessful processing results posted by the auto-process script 234. At 526, the process 500 uses the output manager 308 to auto-post the CPE batch file to an internal billing and/or inventory tracking system. Optionally, at 528, the process 500 can automatically communicate successful and/or unsuccessful processing results and/or the CPE batch file (e.g., email, text message, etc.) to an Integration Specialist or other user for additional analysis and/or returns to 502.

Figure 6:
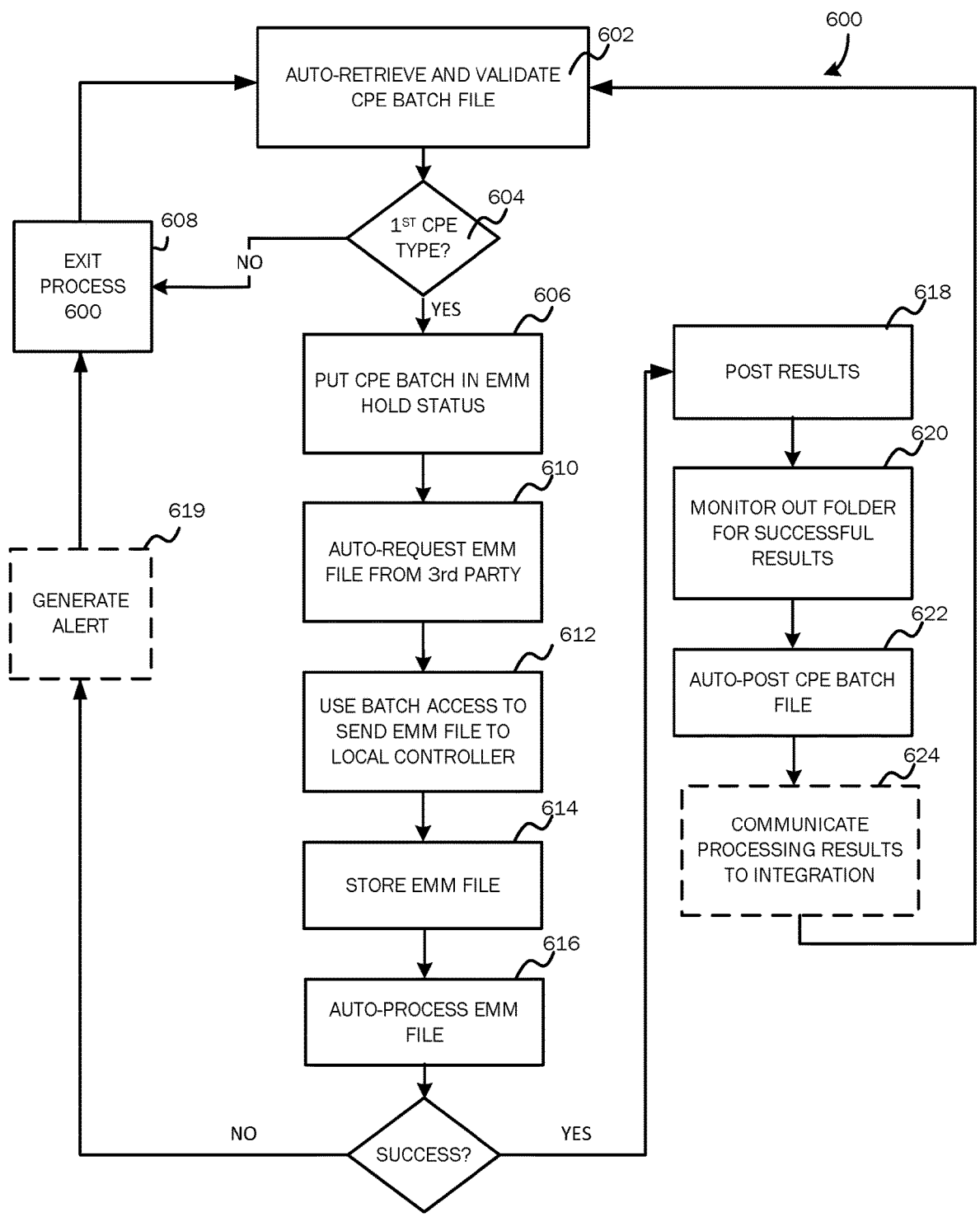
FIG. 6 is a flow diagram that depicts a process of securely provisioning CPE into a service provider network, according to an embodiment.

FIG. 6 is a flow diagram that depicts a process 600 of securely provisioning CPE into a service provider network, according to an embodiment. At 602, the process 600 begins by calling the batch file manager 302 to automatically retrieve and validate a CPE batch file (e.g., validate ADD batch) associated with to be deployed CPE. As described above, the auto-cap application 232 can be configured as a middleware layer that coexists with an internal material management application and/or a third party OLP application. If the batch file manager 302 identifies that the CPE is of a first type (e.g., not manufactured by a first manufacturer) at 604, the process 600 proceeds to 606 and executes a command to place the CPE batch file in EMM HOLD status which delays further processing of the CPE batch file. If the batch file manager 302 identifies that the CPE of the CPE batch file is not of a first type (e.g., not manufactured by a first manufacturer) at 604, the process 600 proceeds to 608 and exits process 600.

At 610, while in the EMM HOLD status to delay processing and/or auto-posting of the CPE batch file, the process 600 calls the key access file manager 304 to automatically send an electronic message (e.g., email, text message, voicemail, etc.) to a third party computer system requesting an EMM file associated with the CPE batch file. At 612, the process 600 uses a batch access function of the auto-cap application 232 to upload the EMM file to the local controller 218. At 614, the process 600 uses the local controller 218 to store the EMM file in the key file store 220. At 616, the process 600 uses the auto-process script 234 to automatically process the EMM file for the to be deployed CPE.

At 618, the process 600 uses the auto-process script 234 to post processing results to the auto-process output store 222 associated with the auto-processing of the EMM file. Unsuccessful processing of the EMM file at causes the process 600 to proceed optionally to 619 to generate an alert or notification and/or proceed to 608. At 620, the process 600 calls the output manager 308 to monitor the auto-process output store 222 for successful or unsuccessful processing results posted by the auto-process script 234. At 622, the process 600 uses the output manager 308 to auto-post the CPE batch file to an internal billing and/or inventory tracking system. Optionally, at 624, the process 600 can automatically communicate successful and/or unsuccessful processing results and/or the CPE batch file (e.g., email, text message, etc.) to an Integration Specialist, other user, and/or computer system for additional analysis and/or returns to 602.

Figure 7:
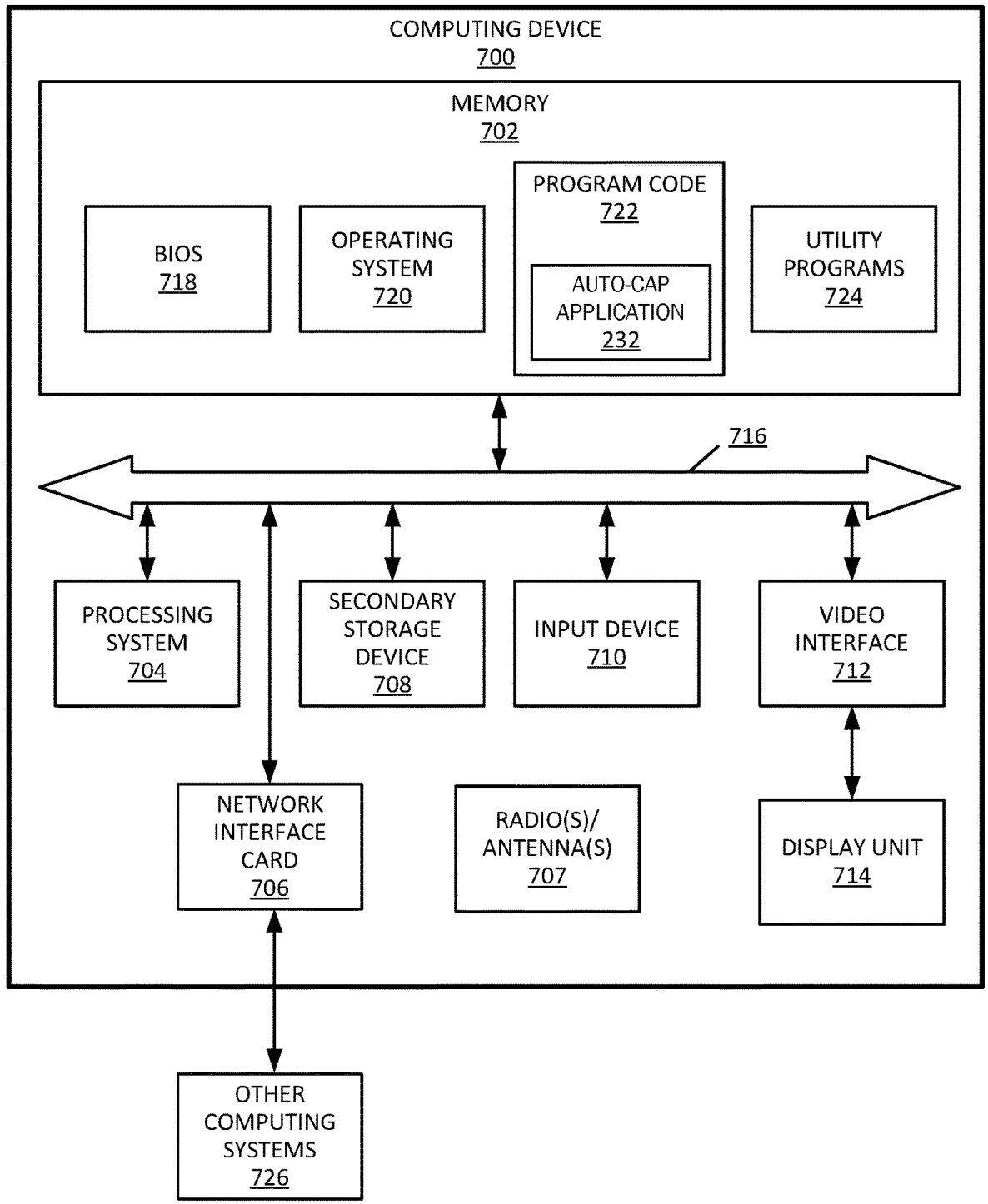
FIG. 7 is a block diagram illustrating example physical components of a computing device or system with which embodiments may be practiced.

FIG. 7 is a block diagram illustrating example physical components of a computing device or system 700 with which embodiments may be practiced. It should be appreciated that in other embodiments, different hardware components other than those illustrated in the example of FIG. 7 may be used. Computing devices may be implemented in different ways in different embodiments. For instance, in the example of FIG. 7, the computing device 700 includes a processing system 704, memory 702, a network interface 706 (wired and/or wireless), radio/antenna 707, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. Memory 702 may store the computer-executable instructions that, when executed by processor 704, cause allocation and/or reallocation operations as part of load balancing internal connections. In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs or program code 722 that, when executed by the processing system 704, cause the computing device 700 to provide applications (e.g., the auto-cap application 232) to users. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system comprising:
    a protected communication network;
    backend equipment coupled to the protected communication network that includes:
        at least one processor;
        a memory storage that includes a deployment manager that uses the processor to:
            retrieve one or more batch files associated with consumer premise equipment (CPE) to be deployed to subscribers;
            retrieve one or more key access files that enable the CPE to securely access services via the protected communication network;
            validate that the one or more key access files correspond to the one or more batch files;
            auto-post one or more validated key access files; and
            monitor an output of a local controller included with headend equipment for auto-processing results of the one or more validated key access files by the local controller; and
    the headend equipment coupled to the protected communication network that includes:
        at least one processor;
        a memory storage that includes a key file store to store the auto-posted one or more validated key access files; and
        the local controller to:
            auto-process the one or more validated key access files to output successful auto-processing results or unsuccessful auto-processing results; and
            store the output in the memory storage for consumption by the deployment manager.

2. The system of claim 1, further comprising:
    at least one backend server provided with the backend equipment that uses a file transfer protocol (FTP) to retrieve the one or more batch files associated with the CPE that comprises analog and/or digital communication equipment; and
    at least one headend server provided with the headend equipment that manages communication of secure key data to the CPE.

3. The system of claim 2, wherein the analog and/or digital communication equipment comprises one or more set-top boxes (STBs).

4. The system of claim 1, wherein the one or more batch files are retrieved from a third party computer system.

5. The system of claim 4, wherein the one or more key access files are retrieved from the same or a different third party computer system.

6. The system of claim 1, wherein the one or more key access files comprise Entitlement Management Message (EMM) files that include EMM data.

7. The system of claim 6, wherein the deployment manager comprises an auto-capitalization application that includes program code configured to use a script to:
    retrieve the EMM files from a third party computer system;
    validate that the EMM files correspond to the CPE of the one or more batch files;
    convey a message to delineate that the EMM files correspond to the CPE; and
    control a transfer of EMM data included with the EMM files to enable the CPE to access services via the protected communication network.

8. The system of claim 7, wherein the CPE includes a conditional access module that uses the EMM files to access services via the protected communication network.

9. The system of claim 1, wherein the backend equipment auto-posts CPE information associated with the one or more key access files in a billing system or provisioning system.

10. The system of claim 1, wherein the deployment manager issues a hold command when the CPE is of a first type.

11. The system of claim 10, wherein the deployment manager:
    retrieves an EMM file associated with each batch of equipment after the hold command is issued; and
    the local controller uses a coded script to auto-process the EMM file.

12. The system of claim 1, wherein the deployment manager auto-posts the one or more validated key access files absent using a web service call.

13. A method comprising:
    using backend equipment that includes at least one server machine including a deployment manager as part of:
        retrieving one or more batch files associated with CPE to be deployed to subscribers;
        retrieving one or more key access files that enable the CPE to securely access services via the protected communication network;
        validating that the one or more key access files correspond to the one or more batch files;
        auto-posting one or more validated key access files; and
        monitoring an output of a local controller included with headend equipment for auto-processing results of the one or more validated key access files by the local controller; and
    using the headend equipment that includes at least one server machine comprising the local controller as part of:
        auto-processing the one or more validated key access files to output successful auto-processing results or unsuccessful auto-processing results; and
        storing the output in a memory storage for consumption by the deployment manager.

14. The method of claim 13, further comprising retrieving the one or more batch files from a third party computer system.

15. The method of claim 14, further comprising retrieving the one or more key access files from the same or a different third party computer system.

16. The method of claim 13, wherein the one or more key access files comprise EMM files that include EMM data.

17. The method of claim 16, wherein the at least one server machine of the backend equipment comprises an auto-capitalization application that includes program code configured to use a script as part of:
    retrieving the EMM files from a third party computer system;
    validating that the EMM files correspond to the CPE of the one or more batch files;
    conveying a message to delineate that the EMM files correspond to the CPE; and
    controlling a transfer of EMM data included with the EMM files to enable the CPE to access services via the protected communication network.

18. The method of claim 17, further comprising using the auto-capitalization application to issue a hold command when the CPE is of a first digital terminal type.

19. The method of claim 18, further comprising using the auto-capitalization application to auto-post the one or more validated key access files absent using a web service call.

20. A non-transitory computer readable medium that includes executable instructions which, when executed by a processor:
　use a backend server machine including a deployment manager as part of:
　　retrieving one or more batch files associated with CPE to be deployed to subscribers;
　　retrieving one or more key access files that enable the CPE to securely access services via the protected communication network;
　　validating that the one or more key access files correspond to the one or more batch files;
　　auto-posting one or more validated key access files; and
　　monitoring an output of a local controller included with a headend server machine for auto-processing results of the one or more validated key access files by the local controller; and
　use the headend server machine comprising the local controller as part of:
　　auto-processing the one or more validated key access files to output successful
　　auto-processing results or unsuccessful auto-processing results; and
　　storing the output in a memory storage for consumption by the deployment manager.

\* \* \* \* \*